(12) United States Patent
Tanaka (10) Patent No.: US 6,196,493 B1
(45) Date of Patent: Mar. 6, 2001

(54) APPARATUS FOR CONVEYING PHOTOSENSITIVE MATERIAL

(75) Inventor: Tetsuya Tanaka, Kanagawa-ken (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/332,140

(22) Filed: Jun. 14, 1999

(30) Foreign Application Priority Data

Jun. 12, 1998 (JP) .................................................. 10-164573

(51) Int. Cl.[7] .................................................. B65H 20/02
(52) U.S. Cl. ........................ 242/564.4; 242/563; 242/612; 242/422.4
(58) Field of Search ................................ 242/564.4, 563, 242/612, 422.4

(56) References Cited

U.S. PATENT DOCUMENTS

| | | | |
|---|---|---|---|
| 4,466,579 | * 8/1984 | Nitsch et al. | 242/422.4 X |
| 4,834,309 | * 5/1989 | Raymond | 242/564.4 X |
| 4,928,897 | * 5/1990 | Satou et al. | 242/564.4 |
| 5,362,008 | * 11/1994 | Nagel et al. | 242/564.4 X |
| 5,553,809 | * 9/1996 | Oku | 242/564.4 X |
| 5,758,840 | * 6/1998 | Murakami | 242/564.4 X |
| 5,769,350 | * 6/1998 | Oka | 242/422.4 |

FOREIGN PATENT DOCUMENTS

| | | | |
|---|---|---|---|
| 63-58442 | * 3/1988 | (JP) | 242/564.4 |
| 7-114108 | 5/1995 | (JP) | G03B/27/00 |

\* cited by examiner

*Primary Examiner*—Donald P. Walsh
*Assistant Examiner*—Minh-Chau Pham
(74) *Attorney, Agent, or Firm*—Sughrue, Mion, Zinn, Macpeak & Seas, PLLC (57) ABSTRACT

An apparatus for conveying photosensitive material includes a core for holding a roll of photosensitive material in a paper magazine, drive rollers disposed in a conveyance path of the photosensitive material, two sets of nip rollers disposed to oppose the drive rollers at upstream and downstream locations relative to the forward direction of photosensitive material conveyance, rewind nip rollers disposed to oppose the upstream set of nip rollers, and a controller for controlling the drive rollers. When the photosensitive material is wound back into the paper magazine after use, the control means causes the drive rollers to rotate in reverse until the leading end portion of the photosensitive material is located between the upstream nip rollers and the rewind nip rollers. This enables the leading end portion of the photosensitive material to be held straight (without bowing), thereby protecting it from curling.

3 Claims, 7 Drawing Sheets

APPARATUS FOR CONVEYING PHOTOSENSITIVE MATERIAL

BACKGROUND OF THE INVENTION

1. Field of the Invention

The present invention relates to an apparatus for conveying photosensitive material capable of conveying photosensitive material out of a paper magazine and sending it to a main processing unit such as a printer.

2. Description of the Related Art

A printer for printing images from negative film onto photographic paper or other such photosensitive material is installed with a paper magazine containing a roll of photosensitive material wound on a paper tube. The photosensitive material is drawn out of the paper magazine and cut to the desired size by a cutter, and the cut photosensitive material is conveyed to the printer to print images on the photosensitive material. After printing, the printed photosensitive material is sent from the printer to a developer for development.

A conveyance apparatus for drawing photosensitive material out of this type of paper magazine is taught by Japanese Unexamined Patent Publication No. 7(1995)-114108. This apparatus includes a set of drive rollers and opposing sets of nip rollers, both provided in the paper magazine. The photosensitive material is passed between the drive rollers and the nip rollers and the drive rollers are rotated by a driving power source installed in the main processing unit, typically a printer, to convey the photosensitive material as nipped between the drive rollers and the nip rollers.

The stability of photosensitive material conveyance can be enhanced by increasing the nipping force of the nip rollers on the photosensitive material. When the nipping force is set too high, however, the photosensitive material experiences pressure-fogging and nip-scratching. This has prompted the development of conveyance apparatuses that enhance the material conveyance stability by providing a pair of nip roller sets to enable the required nipping force to be applied to the photosensitive material as a whole even if the nipping force of the individual nip rollers is reduced. (The conveyance apparatus taught by Japanese Unexamined Patent Publication No. 7-114108, for example, enhances the conveyance stability of the photosensitive material by use of two sets of nip rollers.)

When the size of the photosensitive material to be used in a printer or other such processing apparatus is changed, the paper magazine has to be replaced with one loaded with photosensitive material of the new size. If this is done with the photosensitive material still drawn out of the paper magazine, the leading end of the photosensitive material will be exposed. Therefore, after the development or other processing of the photosensitive material has been completed, the set of drive rollers is driven in reverse to wind back the photosensitive material until its leading end is located inside the paper magazine. This prevents exposure of the leading end of the photosensitive material when the paper magazine is changed.

Figure 7:
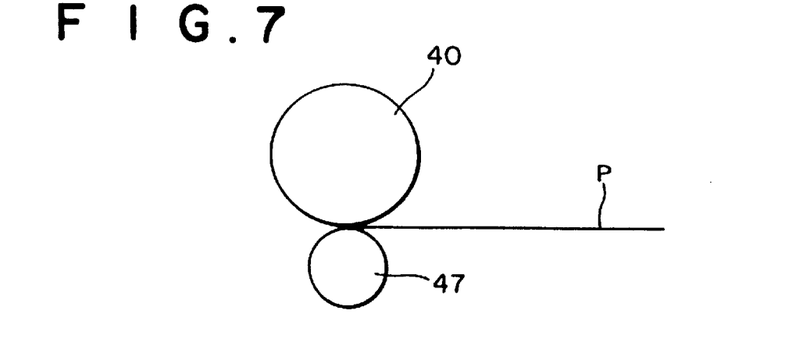
FIG. 7 is a diagram showing the state of the leading end of a photosensitive material nipped between a drive roller and a nip roller.
Figure 8:
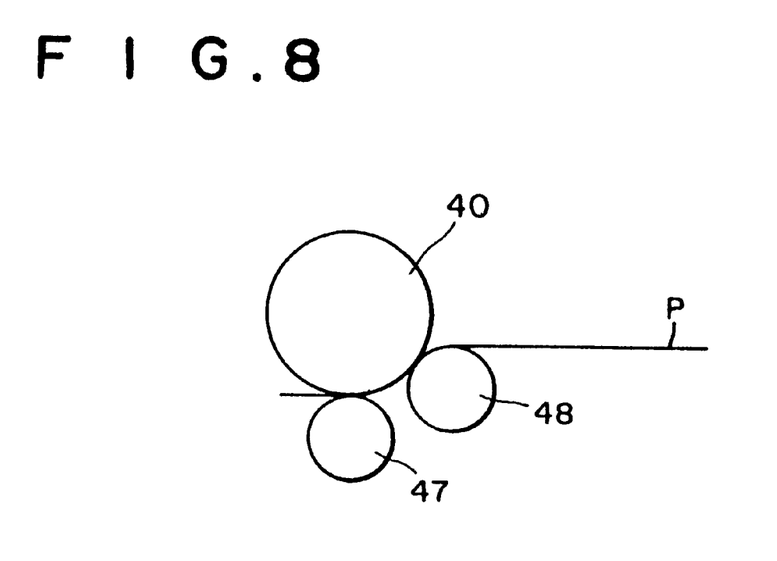
FIG. 8 is a diagram showing the state of the leading end of a photosensitive material nipped between a drive roller and a pair of nip rollers.

After the photosensitive material has been wound back into the paper magazine in this way, the leading end of the photosensitive material is kept in a nipped condition between the drive rollers and the nip rollers. FIGS. 7 and 8 respectively show how the leading end of the photosensitive material is held when only a single nip roller set is used and when a pair of nip roller sets are used. As shown, when only a single set of nip rollers is used, the leading end of the photosensitive material is maintained substantially straight but when two sets of nip rollers are used it is bowed between the two sets. This imparts undesirable curl to the leading end portion of the photosensitive material. When the photosensitive material imparted with such curl is conveyed, conveyance stability is liable to be degraded owing to jamming of the photosensitive material at conveyance rollers or some other portion of the main unit. Although this problem can be avoided by cutting off a narrow lateral strip from the leading end of the photosensitive material to remove the curl at the start of photosensitive material conveyance, this leads to another problem of paper fragments produced by the cutting being dispersed inside the main processing unit.

SUMMARY OF THE INVENTION

This invention was accomplished in light of the foregoing circumstances and has as an object to provide an apparatus for conveying photosensitive material that prevents curl from arising at the leading end of a photosensitive material when the photosensitive material is in the wound-back condition.

The apparatus for conveying photosensitive material according to the present invention comprises:

a paper magazine for accommodating a roll of photosensitive material, a core for rotatably holding the roll of photosensitive material in the paper magazine, one or more drive rollers rotatably disposed in a conveyance path of the photosensitive material in the paper magazine, a driving power source for driving the drive rollers, disposed in a main unit for processing photosensitive material fed from the paper magazine and connected with the drive rollers, two sets of one or more nip rollers rotatably disposed to oppose the drive rollers at upstream and downstream locations relative to a forward direction of photosensitive material conveyance and adapted to contact the drive rollers to nip the photosensitive material and convey it from the paper magazine to the main unit in cooperation with the drive rollers, one or more rewind nip rollers rotatably disposed to oppose the upstream set of nip rollers and adapted to contact the upstream nip rollers to nip a leading end portion of the photosensitive material, and control means for, after the main unit has completed processing of the photosensitive material, controlling the driving power source to rotate the drive rollers in reverse until the leading end portion of the photosensitive material reaches a position where it is nipped between the upstream nip rollers and the rewind nip rollers.

In the present invention, the nipping force of the nip rollers and the rewind nip rollers on the photosensitive material is preferably about 3 kgf.

The core is preferably equipped with an inner core, bearings for rotatably supporting the inner core and friction members provided on peripheral surface portions of the inner core for imparting a prescribed frictional force between the core and the bearings during rotation of the inner core.

In operation of the apparatus for conveying photosensitive material according to present invention, the drive rollers are driven by the driving power source, the two sets of nip rollers disposed to oppose the drive rollers contact the drive rollers, and the photosensitive material is nipped between the drive rollers and the nip rollers to be conveyed from the paper magazine to the main unit. After processing of the photosensitive material has been completed, the control means causes the drive rollers to be rotated in reverse until the leading end portion of the photosensitive material reaches the position where it is nipped between the upstream nip rollers and the rewind nip rollers. The leading end portion of the photosensitive material is thereafter maintained in this condition of being nipped and held between the upstream nip rollers and the rewind nip rollers. In such condition, unlike in the case where the leading end portion of the photosensitive material is nipped between the drive rollers and two sets of nip rollers, the leading end portion of the photosensitive material does not experience bowing. Since curling of the leading end portion of the photosensitive material can therefore be avoided, curl-induced degradation of the conveyance stability of the photosensitive material can be prevented.

As the nipping force of the nip rollers and the rewind nip rollers on the photosensitive material is set to about 3 kgf, even a photosensitive paper of the largest size is safe from having its leading end portion pulled out from between the nip rollers and the rewind nip rollers by the weight of the photosensitive material itself. This was experimentally confirmed by the inventor.

The friction members maintain a frictional force on the core holding the roll of photosensitive material that prevents rotation of the core unless it is acted on by at least a prescribed torque. This prevents unnecessary rotation of the roll of photosensitive material in the paper magazine. As the photosensitive material is used, however, the weight of the roll of photosensitive material decreases. Therefore, at the early stage of using the roll of photosensitive material, a large torque is needed to rotate the roll of photosensitive material owing to its large diameter (weight), but when only a small amount of the photosensitive material remains, the roll of photosensitive material can be rotated with a relatively small torque. Thus, if both the frictional force acting on the core and the conveyance force applied to the photosensitive material by the drive rollers during conveyance stay constant, the conveyance load will change between earlier and later stages of photosensitive material use and the cut length of the photosensitive material is liable to vary as a result.

In the present invention, therefore, the friction members that impart frictional force to the core during its rotation are provided on peripheral surface portions of the core. This enables the frictional force acting to inhibit rotation of the roll of photosensitive material to be decreased proportionally as the amount of remaining photosensitive material decreases because the weight of the roll of photosensitive material bearing on the friction members decreases as the remaining amount decreases. Since the frictional force against rotation therefore decreases as the photosensitive material is used, the conveyance load does not vary and the photosensitive material can be conveyed with high stability.

DESCRIPTION OF THE PREFERRED EMBODIMENT

An embodiment of the invention will now be explained with reference to the drawings.

Figure 1:
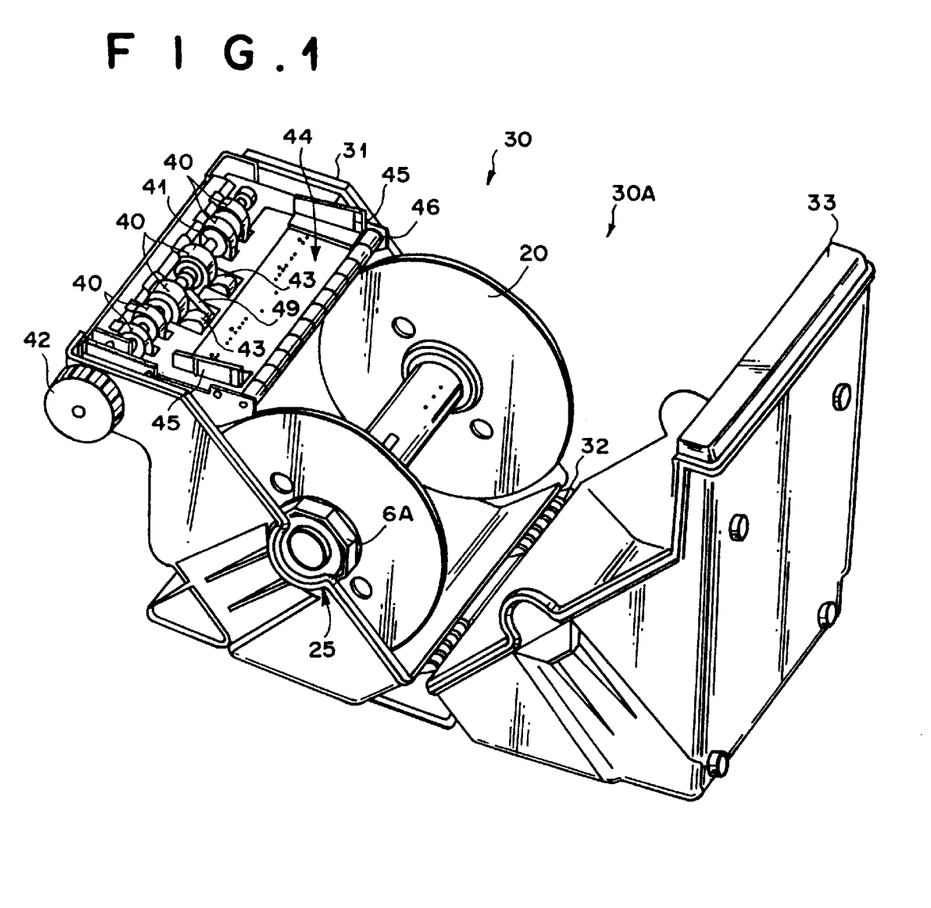
FIG. 1 is a perspective view showing the structure of a paper magazine equipped with an apparatus for conveying photosensitive material that is an embodiment of the invention.
Figure 2:
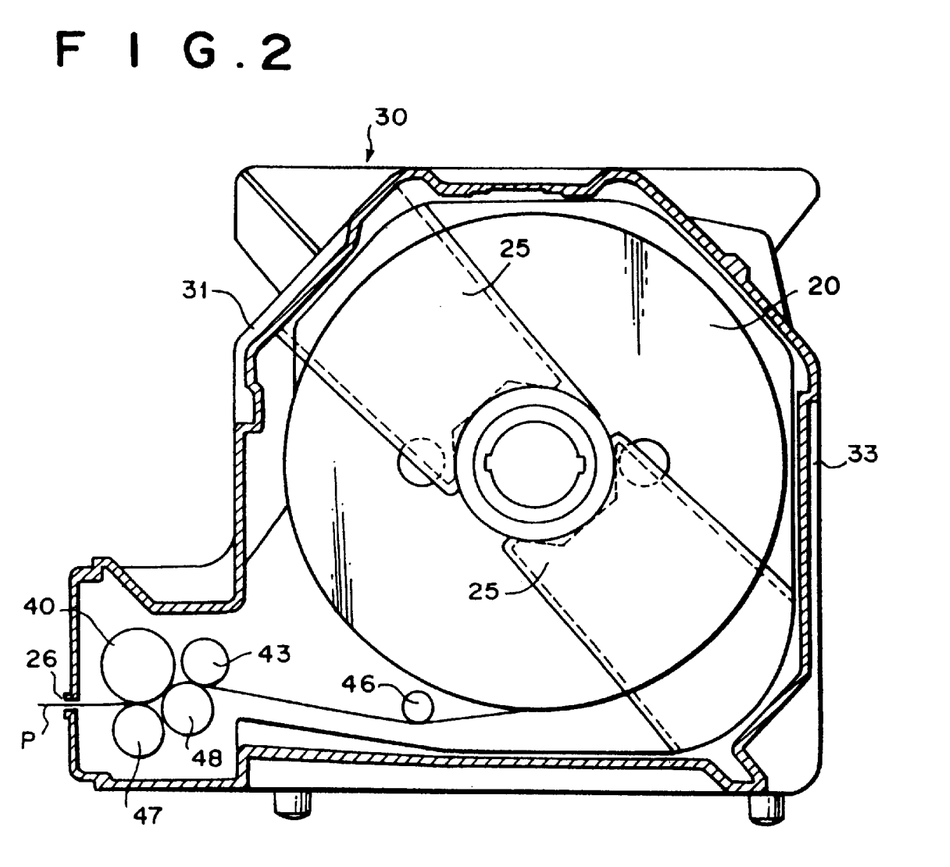
FIG. 2 is a sectional view of the paper magazine taken perpendicular to the longitudinal axis of a core loaded therein.
Figure 3:
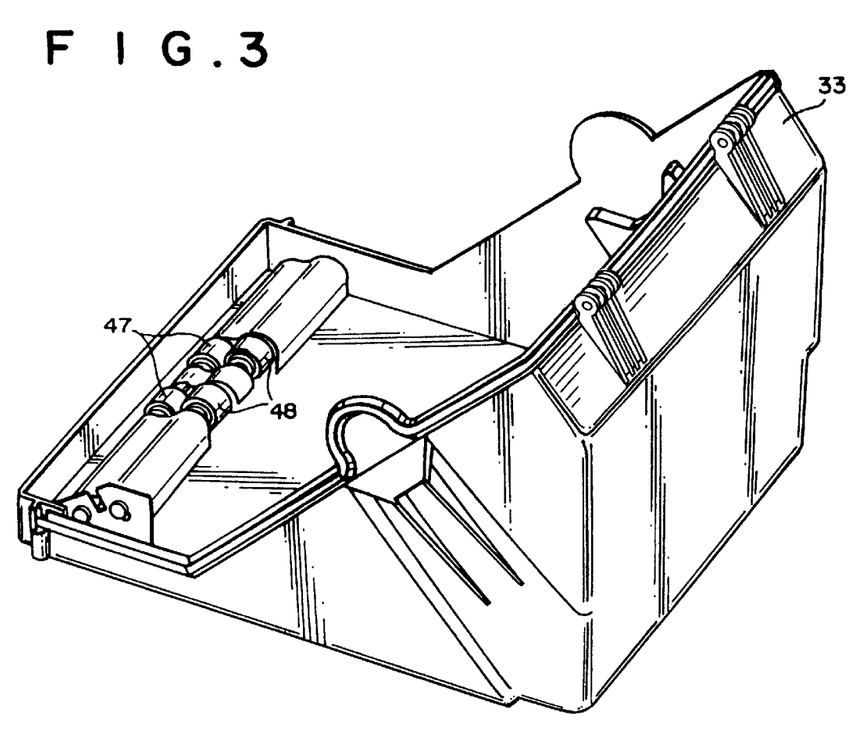
FIG. 3 is a perspective view showing the structure of a cover unit of the paper magazine.

FIG. 1 is a perspective view showing the structure of a paper magazine equipped with an apparatus for conveying photosensitive material that is an embodiment of this invention. FIG. 2 is a sectional view of the paper magazine taken perpendicular to the longitudinal axis of a core loaded therein. FIG. 3 is a perspective view showing the structure of a cover unit of the paper magazine. As shown in FIG. 1, the paper magazine 30 has a box-like magazine unit 31 into which a core 20 holding a roll of photosensitive material (not shown) can be loaded through an opening 30A. A cover unit 33 is attached to one end of the magazine unit 31 by a hinge 32. The cover unit 33 is rotated around the hinge 32 from the open state shown in FIG. 1 to cover the opening 30A in the closes state shown in FIG. 2.

At the opposite end of the magazine unit 31 from the hinge 32 are rotatably supported drive rollers 40 for feeding the leading end portion of the photosensitive paper P out of the paper magazine 30. The drive rollers 40 are mounted on a rotary shaft 41 having a pulley 42 attached to its one end.

Figure 4:
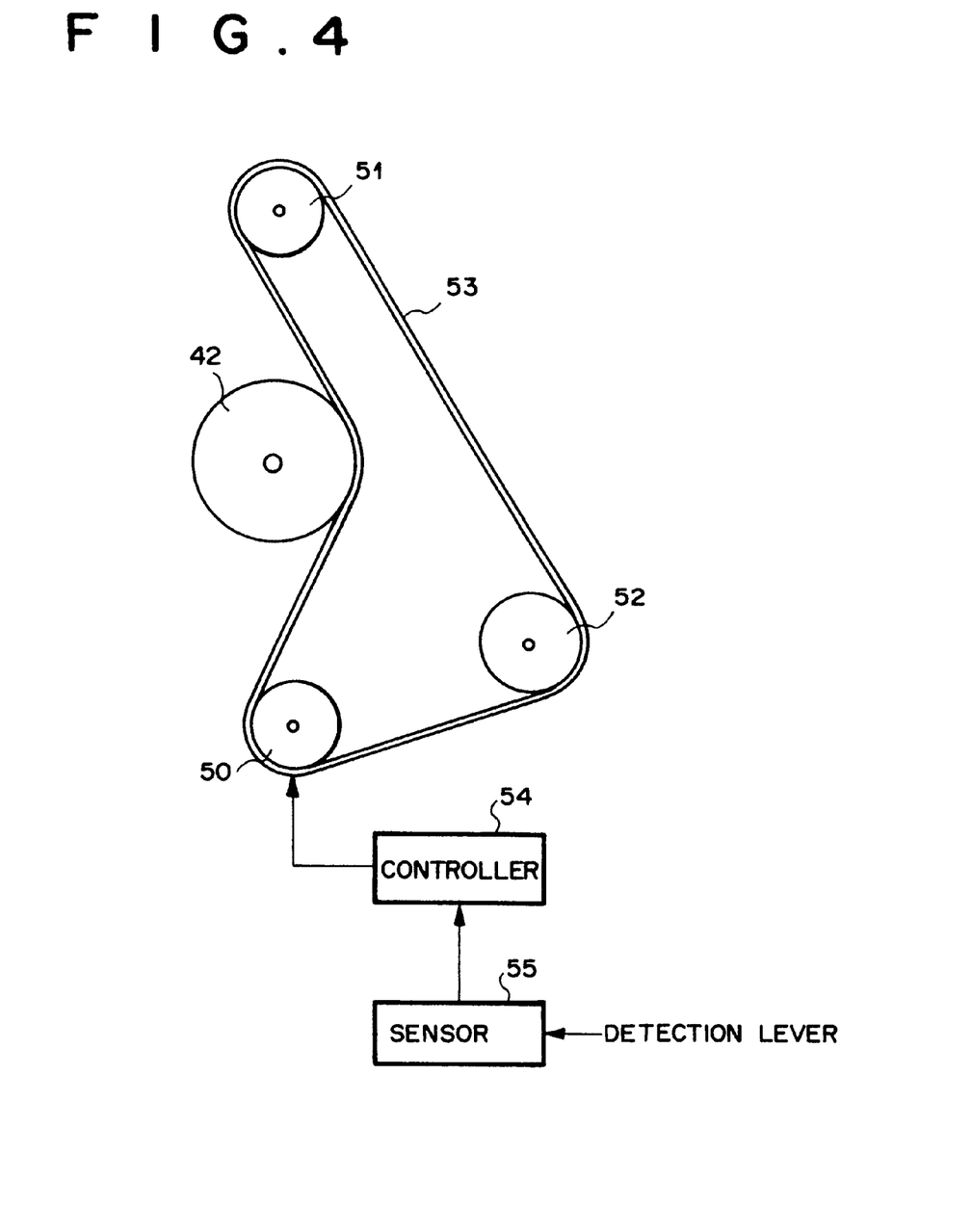
FIG. 4 is a diagram showing the arrangement of a drive device for rotating a pulley.

FIG. 4 is a diagram showing the arrangement of a drive device for rotating the pulley. The drive device illustrated in FIG. 4 is provided in a photographic printing apparatus that uses the paper magazine 30. It includes a pulse motor 50, first and second pulleys 51, 52, and a drive belt 53 wound around the motor and pulleys and constituting a timing belt. The drive belt 53 also wraps over the pulley 42. The power of the pulse motor 50 is therefore transmitted to the drive rollers 40 so as to rotate them. The pulse motor 50 is connected to a controller 54 that controls its operation (start, stop and direction of rotation).

Free-rotating nip rollers 43 are installed upstream of the drive rollers 40 relative to the direction of photosensitive material conveyance and a guide section 44 for positionally restraining the lateral (widthwise) position of the photosensitive paper P is installed upstream of the rewind nip rollers 43. The guide section 44 is formed with multiple screw holes. Paired guides 45 are attached at screw holes whose positions conform with the width of the photosensitive paper P used, thereby matching the distance between the guides 45 to the photosensitive paper P. Guide rollers 46 for guiding the photosensitive paper P are installed upstream of the guide section 44.

As shown in FIGS. 2 and 3, a first set (pair) of nip rollers 47 and a second set (pair) of nip rollers 48 are rotatably supported on the cover unit 33 at positions opposing the drive rollers 40 so as to define the conveyance path of the photosensitive paper P. When the cover unit 33 is closed, the nip rollers 47, 48 are urged toward the drive rollers 40 by springs (not shown) under a force of 3 kgf.

A detection lever 49 is rotatably supported coaxially with the rewind nip rollers 43. The detection lever 49 can move between a position where it projects into the conveyance path of the photosensitive paper P and a position where it is retracted from the conveyance path. The detection lever 49 moves to the retracted position during conveyance of the photosensitive paper P and projects into the conveyance path when the photosensitive paper P is not present. It can therefore be detected when the photosensitive paper P has been used up by detecting projection of the detection lever 49 into the conveyance path. The position of the detection lever 49 is detected by a sensor 55 provided in the photographic printer. The signal output by the sensor 55 is sent to the controller 54, which uses it to control the rotation of the pulse motor 50 and, in turn, the drive rollers 40.

The magazine unit 31 and the cover unit 33 are provided with bearings 25 for holding retainers 6A, 6B (only 6A shown in FIG. 1) of the core 20. The bearings 25 are octagonally configured to match the shape of the retainers 6A, 6B. When the core 20 is loaded in the paper magazine 30, the retainers 6A, 6B are therefore supported by the bearings 25 so as to be incapable of rotating.

Figure 5:
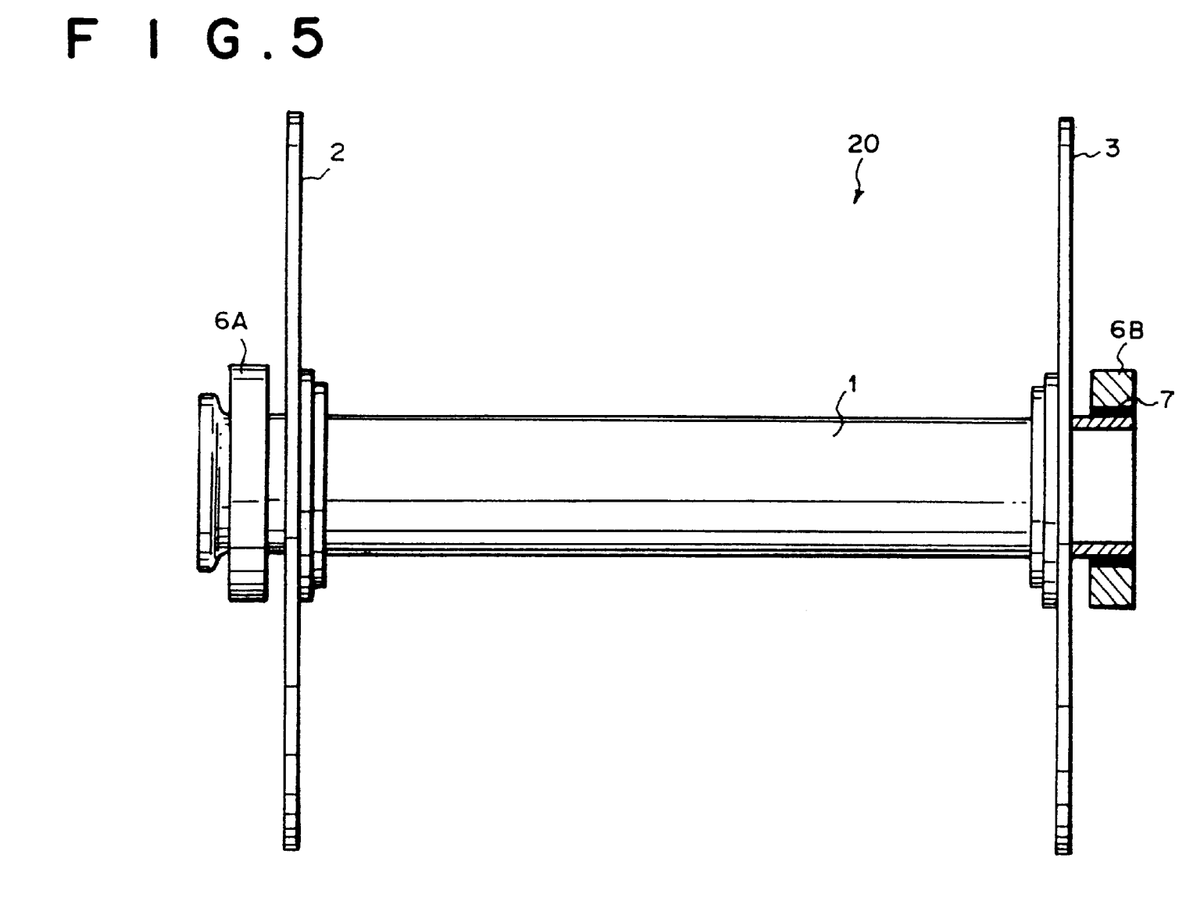
FIG. 5 is a diagram showing the structure of a core.

The structure of the core 20 is shown in FIG. 5. As illustrated, the core 20 comprises an inner core 1 and flange members 2, 3. A roll of photosensitive material is held on the core 20 with its lateral (widthwise) position regulated by the flange members 2, 3. The retainers 6A, 6B are attached to the opposite ends of the inner core 1, which is rotatably supported thereby. As shown by the sectional portion of FIG. 5, friction members 7 of felt or the like (only one shown) are adhered around the end portions of the inner core 1 and the retainers 6A, 6B are attached to the opposite ends of the inner core 1 by fitting them over the friction members 7. Hence a certain amount of frictional force is produced when the inner core 1 rotates relative to the retainers 6A, 6B. When the core 20 is loaded in the paper magazine, therefore, it will not rotate unless acted on by a certain amount of torque, whereby unnecessary rotation of the core 20 is prevented.

After the core 20 holding the roll of photosensitive material has been loaded in the paper magazine 30, the photosensitive paper P is, as shown in FIG. 2, guided by the guide rollers 46, laterally guided by the guide section 44 and guided by the drive rollers 40, the rewind nip rollers 43 and the two sets of nip rollers 47, 48 to have its leading end fed to the outside of the paper magazine 30 through an outlet 26 formed in the paper magazine 30.

Figure 6:
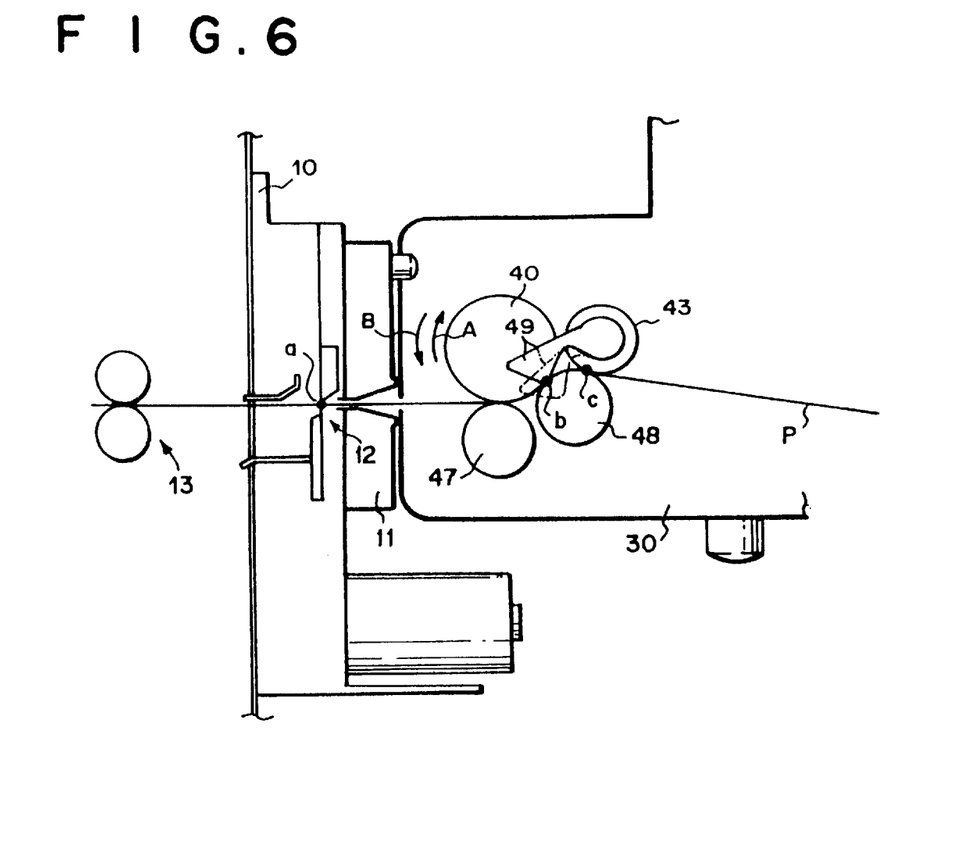
FIG. 6 is a partial enlarged view for explaining the operation of the apparatus for conveying photosensitive material.

The operation of the apparatus for conveying photosensitive material of this embodiment will now be explained. FIG. 6 is a partial enlarged view for explaining the operation of the apparatus for conveying photosensitive material according to this embodiment. This figure shows the paper magazine 30 installed on a photographic printer 10. The only portions of the photographic printer 10 shown are a mount 11 for attaching the paper magazine 30, a cutter 12 for cutting the photosensitive paper P, and conveyance rollers 13 for conveying the cut photosensitive paper P to the following exposure section. (In this embodiment, the number of sheets of the photosensitive paper P to be exposed is input to the controller 54.)

During normal conveyance, the controller 54 (FIG. 4) controls the pulse motor 50 to rotate the drive rollers 40 in the forward direction, i.e., in the direction of the arrow A in FIG. 6. This causes the photosensitive paper P nipped between the drive rollers 40 and the two sets of nip rollers 47, 48 to be fed out of the paper magazine 30 to the photographic printer 10. As indicated by the solid line in FIG. 6, the detection lever 49 is at this time in the retracted position out of the conveyance path, and the controller 54 therefore receives no signal from the sensor 55. After the required amount of the photosensitive paper P has been conveyed, the controller 54 halts the operation of the motor 50, whereafter the cutter 12 is operated to cut the photosensitive paper P. The conveyance rollers 13 forward the cut photosensitive paper P to the ensuing exposure section and development section, where it is exposed and developed. The foregoing operations are repeated until the desired number of sheets of the photosensitive paper P have been conveyed to the exposure section by the conveyance rollers 13.

If the paper magazine 30 should run out of photosensitive paper P before the prescribed number of sheets have been fed, the detection lever 49 projects into the conveyance path as shown by the phantom line in FIG. 6. This causes the sensor 55 to send a signal to the controller 54. Upon receiving the signal, the controller 54 immediately stops the motor 50 and controls the photographic printer 10 to produce a display indicating that no paper is left. Upon seeing the indication, the operator reloads the paper magazine 30 with photosensitive paper P.

When the prescribed number of sheets of the photosensitive paper P have been exposed, the controller 54 first stops the operation of the pulse motor 50 and then rotates the pulse motor 50 in the reverse direction to rotate the drive rollers 40 in the direction of the arrow B. This operation causes the photosensitive paper P to be drawn back into the paper magazine 30. First, the leading end of the photosensitive paper P is conveyed backward from the cutter 12 (point a) to the point of contact between the second nip rollers 48 and the drive rollers 40 (point b). When the leading end of the photosensitive paper P passes by the point b, the detection lever 49 projects into the conveyance path, so that a signal is sent from the sensor 55 to the controller 54. Upon receiving this signal, the controller 54 continues to rotate the pulse motor 50 in reverse until the leading end of the photosensitive paper P reaches the point of contact between the second nip rollers 48 and the rewind nip rollers 43 (point c). This completes the draw-back operation. Finally, therefore, the leading end of the photosensitive paper P is held between the second nip rollers 48 and the rewind nip rollers 43.

In this condition, the leading end of the photosensitive paper P is fully withdrawn into the paper magazine 30 and is therefore safe from exposure to light. Since it is held only by the second nip rollers 48 and the rewind nip rollers 43, moreover, it does not bow in the wave-like shape shown in FIG. 8. As curling of the leading end of the photosensitive paper P can therefore be avoided, jamming of the leading end of the photosensitive paper P at the conveyance rollers 13 or some other portion of the photographic printer 10 is prevented and the conveyance stability of the photosensitive paper P is enhanced.

The nipping force of the two sets of nip rollers 47 and 48 is set at 3 kgf. In this connection, tests conducted by the inventor showed that when the retaining force exerted on the photosensitive material by the nip rollers 48 and the rewind nip rollers 43 is about 3 kgf, even a photosensitive paper P of the largest size is safe from having its leading end portion pulled out from between the nip rollers 48 and the rewind nip rollers 43 by the weight of the photosensitive material itself. There is, therefore, no risk of the leading end of the photosensitive paper P falling out from between the nip rollers 48 and the rewind nip rollers 43 even during the operation of removing the paper magazine 30 from the photographic printer 10.

On the other hand, as explained earlier, the retainers 6A, 6B of the core 20 for holding the roll of photosensitive material are attached to the opposite end portions of the inner core 1 with the friction members 7 interposed therebetween. Owing to this, no rotation occurs until the applied torque reaches a certain level. With decreasing size of the photosensitive material roll as the photosensitive paper is used, however, the weight of the photosensitive material bearing on the friction members 7 decreases. This lowers the frictional force inhibiting rotation of the roll of photosensitive material. Thus, as the photosensitive paper P is used up, the frictional force during rotation decreases progressively so that the change in conveyance load produced by the change in the weight of the roll of photosensitive material decreases. This enables the photosensitive material to be stably conveyed.

What is claimed is:

1. An apparatus for conveying photosensitive material comprising:

a paper magazine for accommodating a roll of photosensitive material, a core for rotatably holding the roll of photosensitive material in the paper magazine, one or more drive rollers rotatably disposed in a conveyance path of the photosensitive material in the paper magazine, a driving power source for driving the drive rollers, disposed in a main unit for processing photosensitive material fed from the paper magazine and connected with the drive rollers, two sets of one or more nip rollers rotatably disposed to oppose the drive rollers at upstream and downstream locations relative to a forward direction of photosensitive material conveyance and adapted to contact the drive rollers to nip the photosensitive material and convey it from the paper magazine to the main unit in cooperation with the drive rollers, one or more rewind nip rollers rotatably disposed to oppose the upstream set of nip rollers and adapted to contact the upstream nip rollers to nip a leading end portion of the photosensitive material, and control means for, after the main unit has completed processing of the photosensitive material, controlling the driving power source to rotate the drive rollers in reverse until the leading end portion of the photosensitive material reaches a position where it is nipped between the upstream nip rollers and the rewind nip rollers.

2. An apparatus for conveying photosensitive material according to claim 1, wherein a nipping force of the nip rollers and the rewind nip rollers on the photosensitive material is about 3 kgf.

3. An apparatus for conveying photosensitive material according to claim 1 or 2, wherein the core is equipped with an inner core, bearings for rotatably supporting the inner core and friction members provided on peripheral surface portions of the inner core for imparting a prescribed frictional force between the core and the bearings during rotation of the inner core.

* * * * *